United States Patent
Nagano

[11] Patent Number: 5,808,463
[45] Date of Patent: Sep. 15, 1998

[54] METHOD AND APPARATUS FOR MEASURING ADJACENT CHANNEL POWER USING COMPLEX FOURIER TRANSFORM

[75] Inventor: Masao Nagano, Tokyo, Japan

[73] Assignee: Advantest Corporation, Tokyo, Japan

[21] Appl. No.: 747,335

[22] Filed: Nov. 12, 1996

[30] Foreign Application Priority Data

Nov. 15, 1995 [JP] Japan ................................ 7-321053

[51] Int. Cl.$^6$ .................................................. G01R 23/16
[52] U.S. Cl. ..................... 324/76.21; 324/76.78; 324/628; 364/724.1; 364/485; 455/67.3
[58] Field of Search .................................. 324/612, 613, 324/620, 627, 628, 650, 76.19, 76.21, 76.23, 76.78, 76.82; 364/484, 485, 724.1, 724.17; 455/67.1, 67.3, 295; 375/328, 329

[56] References Cited

U.S. PATENT DOCUMENTS

| | | | |
|---|---|---|---|
| 4,794,556 | 12/1988 | Rader | 364/724.17 |
| 4,810,960 | 3/1989 | Owen et al. | 455/67.1 |
| 5,323,391 | 6/1994 | Harrison | 364/724.1 |
| 5,420,516 | 5/1995 | Cabot | 324/620 |
| 5,504,455 | 4/1996 | Inkol | 375/329 |

OTHER PUBLICATIONS

"Digital MCA System Standard RCR STD–32," Research & Development Center For Radio Systems. First Edition; Mar. 1993. pp. 226–227.

*Primary Examiner*—Diep N. Do
*Attorney, Agent, or Firm*—Oblon, Spivak, McClelland, Maier & Neustadt, P.C.

[57] ABSTRACT

A method for measuring an adjacent channel power of a device under test (DUT) such as a radio transmitter. The method comprises the steps of performing a frequency conversion to convert a transmitting signal of the DUT to an intermediate frequency signal; sampling the intermediate frequency signal to convert it to a digital signal; resolving the digital signal into an in-phase component and a quadrature component by a quadrature detection; removing a high frequency component from each of the in-phase and quadrature components; executing a complex Fourier transformation for the in-phase and quadrature components to obtain a frequency spectrum; and computing the leakage power to the adjacent channel from the frequency spectrum.

11 Claims, 4 Drawing Sheets

METHOD AND APPARATUS FOR MEASURING ADJACENT CHANNEL POWER USING COMPLEX FOURIER TRANSFORM

BACKGROUND OF THE INVENTION

1. Field of the Invention

The present invention relates to a method for measuring an adjacent channel power (ACP) in a device under test (DUT) such as a radio transmitter in a short time and a measurement apparatus for it.

2. Description of the Related Art

In a radio communication system such as a mobile communication system, in general, a frequency band assigned to the system is divided into a plurality of frequency channels thereby using each of the channels for a different corresponding communication. Here, a frequency channel used by a transmitter for its transmitting of information is called a transmitting channel, and a leakage power to an adjacent channel from the transmitting channel is called an adjacent channel power. To prevent crosstalk and interference at a receiver side, it is required for each transmitter to control strictly a generation of leakage power to the channel adjacent to the transmitting channel. The adjacent channel power of the device under test (DUT) such as a radio transmitter is usually evaluated by analyzing the transmitting signals from the DUT using a spectrum analyzer.

FIG. 1 is a diagram of frequency-power characteristic which shows schematically channel arrangements at the frequency domain. In FIG. 1, intervals of channel center frequencies shall be 25 kHz. Channels adjacent to both sides of a transmitting channel 90 are adjacent channels 91, and alternate adjacent channels 92 are disposed outside of each of the adjacent channels 91. Higher order adjacent channels are disposed at the outside of each of the alternate adjacent channels 92.

In digital radio communication systems, a time division multiple access (TDMA) is often employed. When a time division multiplex technology such as the TDMA is used, giving attention to one transmitter, a signal is transmitted from this transmitter at prescribed intervals in the form of burst. A continuation period (burst-on block) of one burst in sending signal is called a slot, and a repetition period of pulses in the form of burst is called a frame. For example, in a digital multi-channel access (digital MCA) which has been put into practical use in Japan as a mobile communication system using the TDMA, one frame consists of six slots. In addition, the TDMA is adopted in a digitized cellular radio system and a personal handy-phone system (PHS), in which a frame consists of a plurality of slots.

When the changes in one transmitting channel occur instantaneously like the foregoing burst signal due to the use of the TDMA, an interference wave is induced in a frequency channel adjacent to the transmitting channel.

FIG. 2 shows a representative arrangement example when the adjacent channel power is measured using the spectrum analyzer. A transmitting signal of the DUT 1 is input to the spectrum analyzer 10, available on the market, and the computer 9 is connected to the spectrum analyzer 10. After measurement at a time domain in the spectrum analyzer 10, an average power is computed by the computer 9 for the burst-on block. The measurement method to obtain the adjacent channel power in the transmitter of the digital MCA system is disclosed, for example, in Digital MCA System Standard RCR STD-32, the first edition, pages 226–227, March 1993, issued by Research & Development Center for Radio Systems which is a foundation established in Japan and now called Association of Radio Industries and Businesses.

The conventional measurement method of the adjacent channel power in the system adopting the TDMA, using the arrangement of FIG. 2, will be described below. Hereupon, a normal band width of each of the channels shall be 18 kHz (central frequency ±9 kHz), and intervals of the central frequency of the channels shall be 25 kHz. Moreover, a central frequency of the transmitting channel to be watched shall be a test frequency.

First, based on standards for a carrier frequency and the test frequency, measurement conditions of the spectrum analyzer 10 are set. The transmitting frequency of the DUT 1 such as a transmitter is set to be equal to the test frequency, and the transmitting signal from the DUT 1 is input to the spectrum analyzer 10. The measurements at the spectrum analyzer 10 are subjected to a computation processing by the computer 9. Then, the measurement results are obtained according to the following procedures.

(a) The number of the samplings at the frequency domain is previously decided. After completion of the frequency sweep at the spectrum analyzer 10, the measurements at all of the sample points are fetched into the computer 9 as array variables.

(b) The measured power values for all samples, which are represented in a decibel form, are converted into antilogarithms. The antilogarithm data in a power dimension may be a relative value.

(c) The sum of the power of all samples is obtained and stored as a total power $P_C$.

(d) Measurement of an upper side adjacent channel power $P_u$:

Centering around the frequency obtained by adding the carrier frequency of the transmitting channel to 25 kHz (channel interval), data of each of the samples contained in the normal band width (18 kHz) is fetched into the array variables of the computer 9. The measurement of each sample point is converted into the antilogarithm value of the power, and the sum of the antilogarithm values is obtained as the upper side adjacent channel power $P_u$.

(e) Measurement of a lower side adjacent channel power $P_l$:

Centering around the frequency obtained by subtracting 25 kHz (channel width) from the carrier frequency of the transmitting channel, data of each of the samples contained in the normal band width (18 kHz) is fetched into the array variables of the computer 9. The measurement of each sample point is converted into the antilogarithm value of the power, and the sum of the antilogarithm values is obtained as the lower side adjacent channel power $P_l$.

(f) Then, the computation is made by the computer 9 using the following equations, and the results are given in the form of a decibel.

$$\text{upper side adjacent channel power ratio} = 10\log_{10}(P_u/P_c) \quad (1)$$

$$\text{lower side adjacent channel power ratio} = 10\log_{10}(P_l/P_c) \quad (2)$$

By using the spectrum analyzer, the leakage power to the adjacent channel can be obtained in the foregoing way. This way inevitably involves the sampling at the frequency domain. To catch securely the maximum power to measure, in general, it is necessary to perform the sampling of one or more point per one frame. For this reason, assuming that, for example, the continuation time of one slot be 15 ms and one frame be composed of six frames, the sweep time of at least 90 ms is required for sampling one point. In the event that 500 points are measured on the frequency axis using the spectrum analyzer, at least 45 seconds are needed for one measurement. Therefore, a long time is necessary for obtaining the adjacent channel power by using the spectrum analyzer.

In addition, an analog filter as an intermediate frequency (IF) filter is generally installed within the spectrum analyzer. However, since measurement errors are produced in accordance with the response time of this analog filter, the sweep speed is limited. Specifically, since it is necessary to set the sweep time in inverse proportion to the square of a resolution band width (RBW) of this analog filter, the sweep time should be elongated when the RBW is narrowed. Therefore, time for the measurement is long.

SUMMARY OF THE INVENTION

The first object of the present invention is to provide a measurement method which is capable of measuring an adjacent channel power in a short time, without limitation due to an RBW of an analog filter within a spectrum analyzer.

The second object of the present invention is to provide a measuring apparatus which is capable of measuring an adjacent channel power in a short time, without limitation due to an RBW of an analog filter within a spectrum analyzer.

The first object is achieved by a measuring method of a leakage power of a transmitting signal from a transmitting channel to a channel adjacent thereto, the transmitting signal for the transmitting channel being produced from a tested objective; wherein the method comprises the steps of performing a frequency conversion to convert the transmitting signal to an intermediate frequency signal of a predetermined intermediate frequency; sampling the intermediate frequency signal with a predetermined sampling frequency to convert it to a digital signal; resolving the digital signal into an in-phase component and a quadrature component; removing a high frequency component from each of the in-phase and quadrature components; executing a complex Fourier transformation for the in-phase and quadrature components from which the high frequency components are removed, to obtain a frequency spectrum; and computing the leakage power to the adjacent channel from the frequency spectrum.

In the measurement method of the leakage power to the adjacent channel of the present invention, it is preferable to measure a noise floor of the measuring system and to compensate power value of the frequency spectrum based on the noise floor. Thereafter, the leakage power to the adjacent channel may be computed. In addition, to increase dynamic range and to reduce the amount of computation processing, it is possible that the in-phase and quadrature components from which the high frequency components are removed are subjected to a decimation and a complex Fourier transformation is carried out for the in-phase and quadrature components after the decimation.

The second object is achieved by a measurement apparatus for a leakage power which measures the leakage power of a transmitting signal to a channel adjacent to a transmitting channel, the transmitting signal for said transmitting channel being produced from a tested objective; wherein the apparatus comprises a frequency conversion means for converting the transmitting signal into an intermediate frequency signal of a predetermined intermediate frequency; an A/D conversion means for sampling the intermediate frequency signal with a predetermined sampling frequency to convert it into a digital signal; a quadrature detection means for resolving the digital signal into an in-phase component and a quadrature component; a Fourier transformation means for executing a complex Fourier transformation for the in-phase component and the quadrature component provided from the quadrature detection means to obtain a frequency spectrum; and a computing means for computing the leakage power from the frequency spectrum.

In the measurement apparatus of the leakage power to the adjacent channel of the present invention, a low-pass filter means for removing the high frequency component from the in-phase and quadrature components may be arranged between the quadrature detection means and the Fourier transformation means. Furthermore, a decimation means for thinning out data of the in-phase and quadrature components at a predetermined rate may be inserted between the low-pass filter means and the Fourier transformation means.

In the present invention, by employing a digital processing technology executing a complex fast Fourier transformation (complex FFT), it is possible to measure the leakage power to the adjacent channel in a short time.

The above and other objects, features and advantages of the present invention will become apparent from the following description referring to the accompanying drawings which illustrate an example of a preferred embodiment of the present invention.

DETAILED DESCRIPTION OF THE PREFERRED EMBODIMENT

Figure 1:
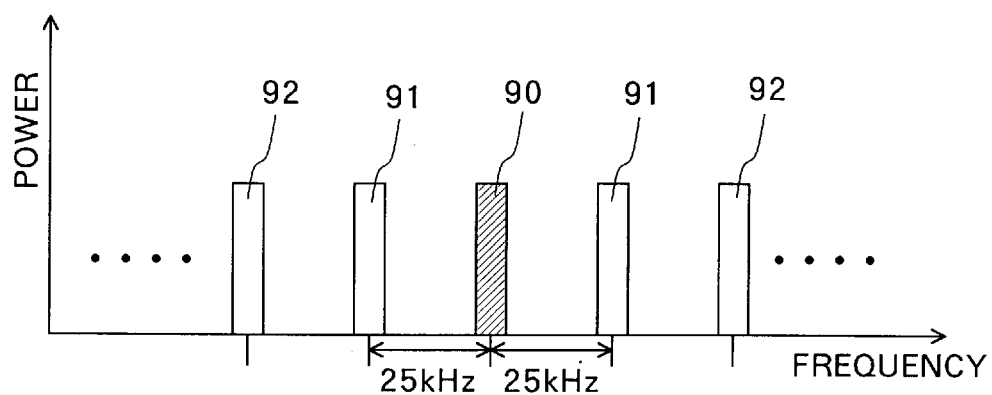
FIG. 1 is a frequency diagram showing an example of an arrangement of a transmitting channel and adjacent channels.
Figure 2:
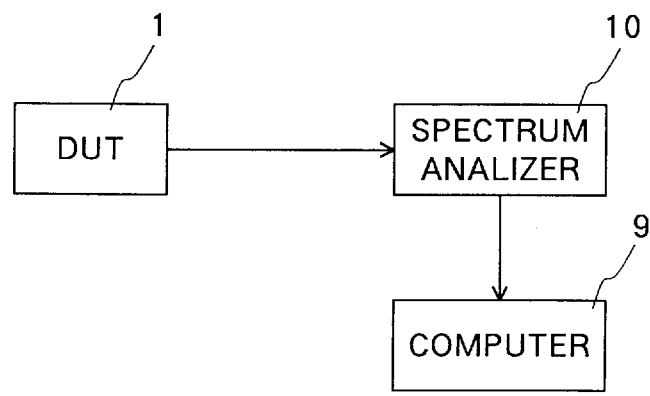
FIG. 2 is a block diagram showing an example of an arrangement for executing a conventional measurement method of a leakage power to an adjacent channel using a spectrum analyzer.
Figure 3:
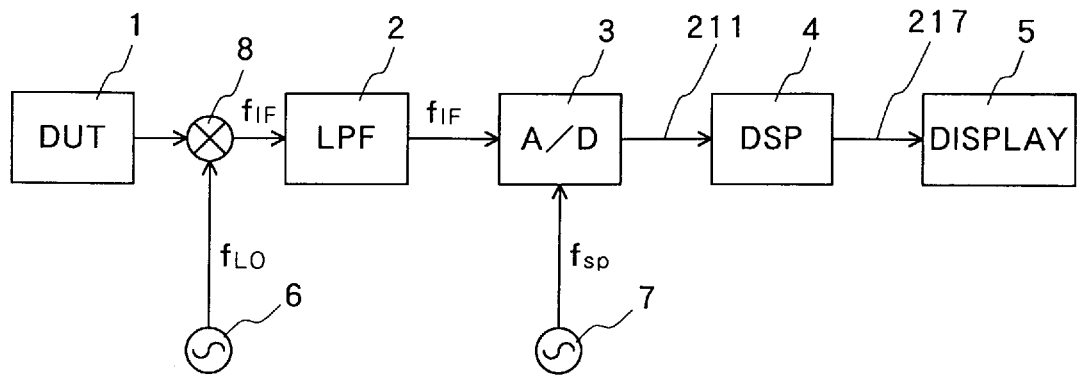
FIG. 3 is a block diagram showing a constitution of a measurement apparatus of a leakage power to an adjacent channel of a preferable embodiment of the present invention.

A constitution of a measurement apparatus according to a preferable embodiment of the present invention is shown in FIG. 3. This measurement apparatus measures an adjacent channel power, which is a leakage power of an adjacent channel of a transmitting channel, of a device under test (DUT) 1 such as a transmitter. The DUT 1 produces a transmitting signal of the predetermined transmitting channel. The measurement apparatus executes a complex FFT (fast Fourier transformation) using a digital signal processor (DSP) 4 to measure the adjacent channel power.

A local oscillator 6 is arranged, which generates a local oscillation signal of a frequency $f_{LO}$, and the transmitting signal from the DUT 1 and the local oscillation signal are input to a mixer 8. The mixer 8 performs a frequency conversion to convert the transmitting signal to the intermediate frequency signal having an intermediate frequency $f_{IF}$. A low-pass filter (LPF) 2 is arranged in an output side of the mixer 8, and an analog-to-digital (A/D) convertor 3 is arranged in an output side of the low-pass filter 8. The A/D convertor 3 performs an analog-to-digital conversion of the intermediate frequency signal to a digital signal 211 and outputs it. A sampling frequency $f_{SP}$ from the oscillator 7 is supplied to the A/D convertor 3. Furthermore, a DSP 4 is provided, which performs a digital signal processing for the digital signal 211 supplied from the A/D convertor 3. A display device 5 displays processing results 217 at the DSP 4.

In the present embodiment, the transmitting channel may be present in any of frequency regions. However, it will be most typical in several ten MHz to several ten GHz. Over against this, the intermediate frequency $f_{IF}$ is set to be low so that the analog-to-digital conversion will be possible, for example, about 220 kHz. Therefore, the frequency conversion may also be performed at several stages so as to be able to obtain finally an intermediate frequency, such as 220 kHz.

Figure 4:
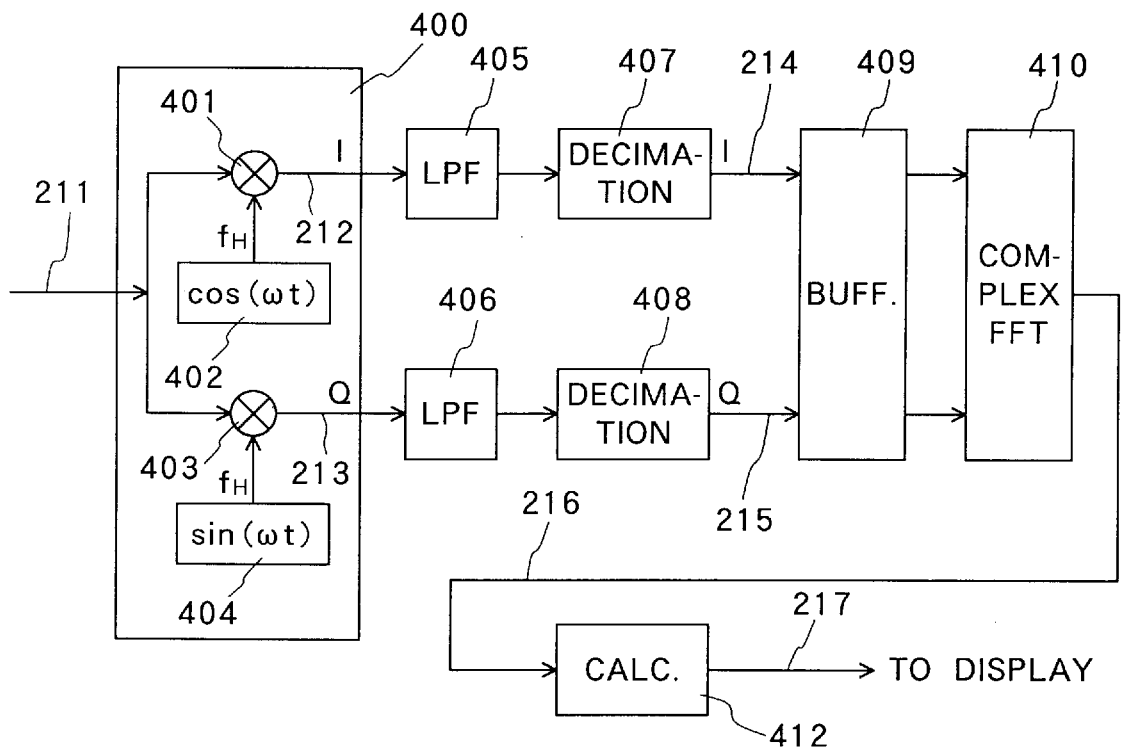
FIG. 4 is a circuit diagram showing a constitution of a digital signal processor (DSP) in the apparatus of FIG. 3.

FIG. 4 is a block diagram showing an internal constitution of the DSP 4. Within the DSP 4, a quadrature detector (orthogonal detector) 400 to perform quadrature detection of the digitized intermediate signal 211 and output an in-phase component I and a quadrature component Q; digital low-pass filters 405 and 406 to remove the high frequency components from the in-phase component I and the quadrature component Q both from the quadrature detector 400, respectively; and decimation sections 407 and 408 to perform decimation processing for outputs from the low-pass filters 405 and 406 are arranged. Furthermore, the DSP 4 includes a one-frame buffer 409 to store therein temporarily the in-phase component I and the quadrature component Q which have been subjected to the decimation processing; an FFT section 410 to perform a complex FFT based on data of the in-phase component I and the quadrature component Q stored in the buffer 409; and a computing section 412 to perform the computation based on results 216 of the complex FFT by the FFT section 410 to obtain the adjacent channel power. The results 217 are output from the computing section 412 to the display device 5. As the one-frame buffer 409, a memory having a sufficient capacitance to store observed signals is used in accordance with the sorts and standards of the measurement to be executed.

Within the quadrature detector 400, signal generators 402 and 404 and multipliers 401 and 403 are provided. The generators 402 and 404 generate digital values of a cosine signal and a sine signal every sampling, respectively, the cosine and sine signals having a same frequency $f_H$. The multipliers 401 and 403 multiply the cosine signal and the sine signal with the digital signal 211 supplied to the quadrature detector 400, respectively. An output signal 212 of the multiplier 401 indicates the in-phase component and is input to the low-pass filter 405. An output signal 213 of the multiplier 403 indicates the quadrature component and is input to the low-pass filter 406.

Figure 5:
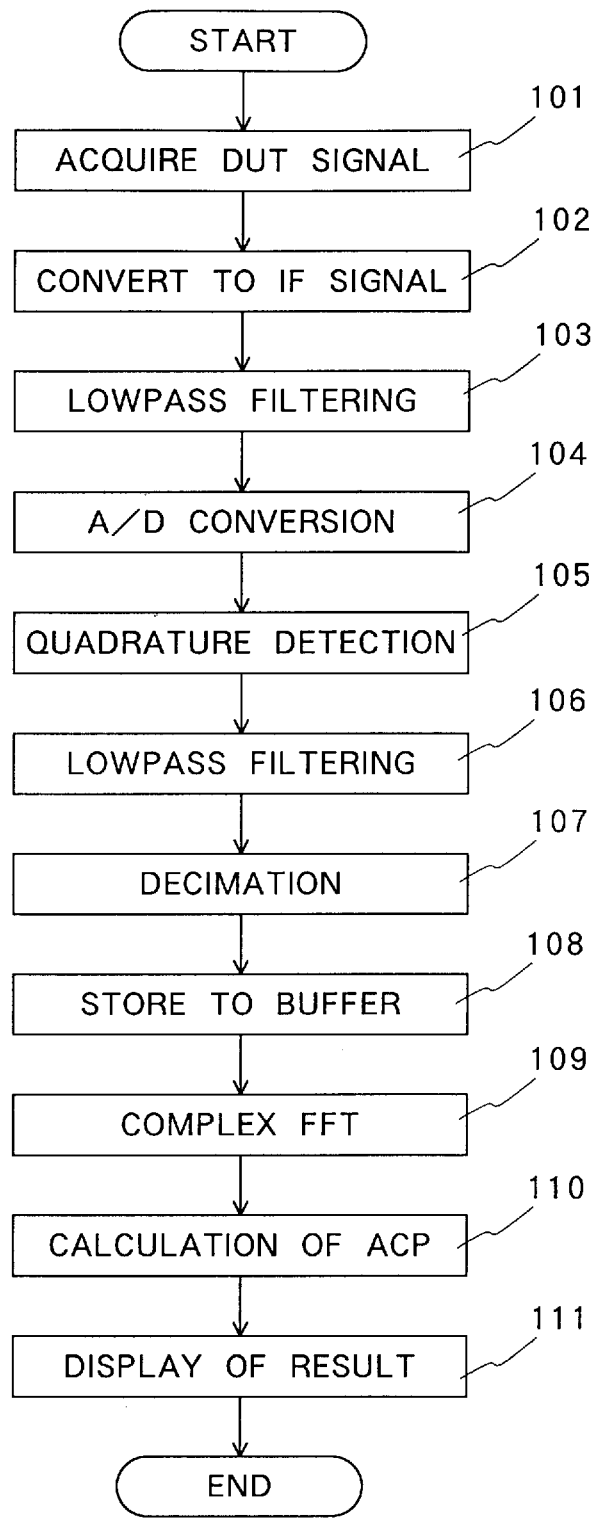
FIG. 5 is a flow chart showing measuring procedures for the leakage power to the adjacent channel.

Subsequently, a measurement method of the adjacent channel power using the foregoing measurement apparatus will be described with reference to the flow chart of FIG. 5.

First, the transmitting signal from the DUT 1 is input to the mixer 8 (step 101). The transmitting signal is mixed with the local oscillation signal from the local oscillator 6 so that the transmitting signal is converted to the intermediate frequency signal (step 102). Thereafter, an unnecessary component is removed from the intermediate frequency signal (step 103). The A/D convertor 3 samples the intermediate frequency signal with the sampling frequency $f_{SP}$ to convert it to the digital signal 211, so that the intermediate frequency signal is made to be numerical (step 104).

The digital signal 211 from the A/D convertor 3 is input to the DSP 4. In the DSP 4, first, the digital signal 211 is supplied to the quadrature detector 400 for quadrature detection (step 105). When $\alpha = 2\pi f_{IF}$ for the intermediate frequency $f_{IF}$ and $\omega = 2f_H$, the value I of the output signal 212 of the in-phase component from the multiplier 401 is expressed as follows.

$$\begin{aligned} I &= \cos(\alpha t) * \cos(\omega t) \\ &= [\cos(\alpha + \omega)t + \cos(\alpha - \omega)t]/2 \end{aligned}$$

Similarly, the value Q of the output signal 213 of the quadrature component from the multiplier 403 is expressed as follows.

$$\begin{aligned} Q &= \cos(\alpha t) * \sin(\omega t) \\ &= [\sin(\alpha + \omega)t + \sin(\alpha - \omega)t]/2 \end{aligned}$$

As described above, in the quadrature detector 400, the signal of two frequency components $f_{IF} \pm f_H$ is output. Only the signal to be observed is fetched by the low-pass filters 405 and 406 (step 106). For example, when removing the component $f_{IF} + f_H$ by the digital low-pass filters 405 and 406 and passing the components $f_{IF} - f_H$ through the filters 405 and 406, the signals I and Q are obtained as the following equations.

$$I = \cos(\alpha - \omega)t$$

$$Q = \sin(\alpha - \omega)t$$

The values I and Q are computed every sampling as described above. The complex FFT may be conducted based on thus obtained values I and Q (output signals 212 and 213). However, in this embodiment, data is thinned out, that is, the data is decimated by the decimation sections 407 and 408, as occasion demands (step 107). The decimation processing is for increasing a dynamic range and shortening processing time, and for decreasing the number of processing data to the extent that the information contained in data is not damaged. Specifically, the decimation processing is to adjust the number of the processing data to a sampling rate of minimum requirements such that it is not superfluous for subsequent processing. For example, the number of the processing data is reduced to one fourth by the decimation processing.

The in-phase component signal 214 and the quadrature component signal 215 which have been subjected to the decimation processing are output from the decimation processing sections 407 and 408, and are fetched into the frame buffer 409 (step 108). Then, among the data stored in the buffer 409, the FFT section 410 performs the complex FFT in which the in-phase component I is dealt with the real part and the quadrature component Q is dealt with the imaginary part (step 109). This complex FFT gives the following frequency spectrum $F(\omega)$.

$$F(\omega) = \int_{-\infty}^{\infty} \{I(t) + jQ(t)\}e^{-j\omega t}\, dt$$

$$\approx \sum_{n=0}^{N} \{I(t_n) + jQ(t_n)\}e^{-j\omega t_n}$$

where N is the number of the samples in the complex FFT. When the SN ratio (ratio of the signal to the noise) in the obtained frequency spectrum $F(\omega)$ is insufficient, the measurements are performed a plurality of times and an average value of the measurement results may be obtained by computing.

After obtaining of the frequency spectrum $F(\omega)$, the power $P_{car}$ of the transmitting channel portion and the power $P_{acp}$ of the adjacent channel portion are obtained by the computing section 412, and an adjacent channel power ratio ACP is computed (step 110). Concretely describing, the power $P_{car}$ of the transmitting channel portion is obtained by integrating the frequency spectrum $F(\omega)$ at the frequency band of the designated transmitting channel and the power $P_{acp}$ of the adjacent channel portion is obtained by integrating the frequency spectrum $F(\omega)$ at the first adjacent channel frequency band for the transmitting channel, as shown by the following equation.

$$P_{car} = \int_{car} F(\omega) d\omega$$

$$P_{acp} = \int_{acp} F(\omega) d\omega$$

The adjacent channel power ratio ACP is obtained by the computation according to the following equation.

$$ACP(dB) = 10\log_{10}(P_{acp}/P_{car})$$

The power ratios for second and third adjacent channels can be obtained by changing the integral range to obtain the power $P_{acp}$ into the frequency range of these channels, on the assumption that the frequency band of the frequency spectrum $F(\omega)$ on the complex FFT is satisfactory. The power ratios computed in such manner are displayed on the display device 5 (step 111).

The power $P_{acp}$ of the adjacent channel portion is anticipated to be a small value. To enhance the measurement accuracy for the power ratio ACP by increasing the dynamic range of the measurement for the power $P_{acp}$, it is profitable to execute the measurements adding the following procedures. Specifically, the noise floor is measured by setting an input signal for the measurement system to zero in level and obtaining data at each measurement condition for the input signal. Then, the noise power based on the measured noise floor is subtracted from the power $P_{car}$ of the transmitting channel portion and the power $P_{acp}$ of the adjacent channel portion, respectively, which are measured under the condition that the transmitting signal is input from the DUT 1. After the compensation of the noise floor, in the same manner as the above, the adjacent channel leakage power ratio ACP may be obtained from the powers $P_{car}$ and $P_{acp}$ from which the noise power is subtracted.

Figure 6:
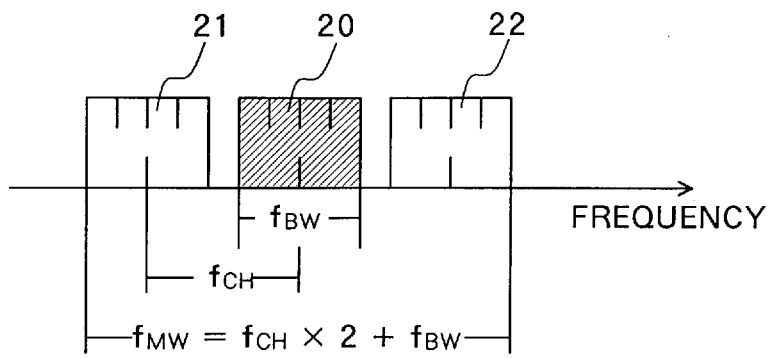
FIG. 6 is a frequency diagram showing an arrangement of the transmitting channel and the adjacent channels.

FIG. 6 is a diagram showing a relation between the transmitting channel and the adjacent channels. As shown in FIG. 6, the lower adjacent channel 21 is suited in a lower frequency side than the transmitting channel 20 and the upper adjacent channel 22 is suited in a higher frequency side than the transmitting channel 20, in a frequency domain. The frequency bandwidth of each channel is expressed as $f_{BW}$, and the interval between the center frequencies of the channels is expressed as $f_{CH}$. To measure the leakage powers to the adjacent channels 21 and 22 of the lower and higher sides, it is proved that $f_{MW} = f_{CH} \cdot 2 + f_{BW}$ is required as the bandwidth of the frequency spectrum $F(\omega)$ after completion of the complex FFT processing.

Figure 7:
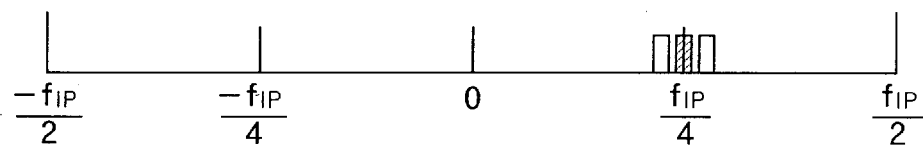
FIG. 7 is a frequency diagram showing an arrangement of the channels after frequency conversion.

The transmitting signal having the channel arrangement as shown in FIG. 6 is converted to the intermediate frequency signal and then is subjected to the sampling processing by the A/D convertor 3, so that the frequency arrangement shown in FIG. 7 is obtained. The intermediate frequency is expressed as $f_{IF}$. Moreover, a frequency $f_{IP}$ is, in general, the same as the sampling frequency $f_{SP}$. Since the signals discussed here are represented by complex numbers, a negative frequency value appears in FIGS. 7, 8, 9 and 10.

Figure 8:
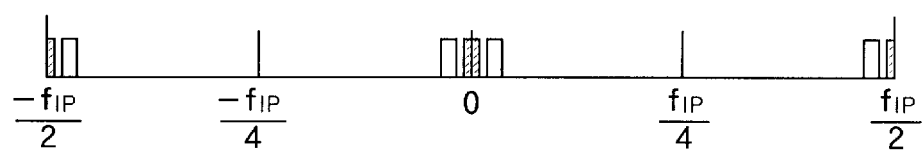
FIG. 8 is a frequency diagram showing an arrangement of the channels after quadrature detection.
Figure 9:
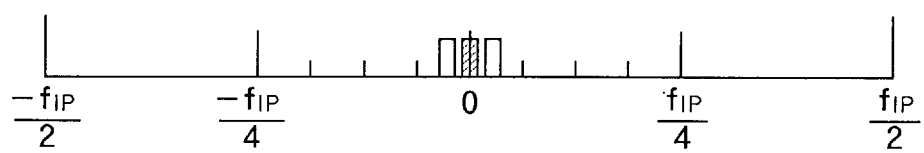
FIG. 9 is a frequency diagram showing an arrangement of the channels after passing through low-pass filters.

FIG. 8 shows the frequency arrangement after the quadrature detection by the quadrature detector 400. In FIG. 8, $f_H = f_{IP}/4$ is satisfied. FIG. 9 shows the frequency arrangement of the signal by inputting the output signals 212 and 213 from the quadrature detector 400 to the low-pass filters 405 and 406.

Figure 10:
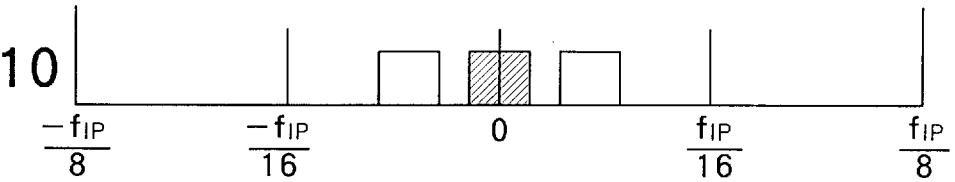
FIG. 10 is a frequency diagram showing an arrangement of the channels after decimation processing.

Furthermore, FIG. 10 shows the frequency arrangement after the ¼ decimation processing. By the ¼ decimation processing, that is, by performing the processing to thin out the number of the samplings to one fourth, the upper limit frequency becomes also one fourth as high as the frequency spectrum obtained by the complex FFT processing. Thus, the frequency band of each channel for the whole band of the frequency spectrum obtained the complex FFT processing becomes one fourth that before the decimation processing, and the dynamic range of the measurement is improved.

The conventional measurement method of the adjacent channel power using the spectrum analyzer required about one to two minutes, however, the measurement method of this embodiment according to the present invention can measure the adjacent channel power in about one second.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A measuring method of a leakage power of a transmitting signal from a transmitting channel to a channel adjacent thereto, the transmitting signal for the transmitting channel being produced from a tested objective, comprising the steps of:

performing a frequency conversion to convert said transmitting signal to an intermediate frequency signal of a predetermined intermediate frequency;

sampling said intermediate frequency signal with a predetermined sampling frequency to convert it to a digital signal;

resolving said digital signal into an in-phase component and a quadrature component;

removing a high frequency component from each of said in-phase and quadrature components;

executing a complex Fourier transformation for said in-phase and quadrature components from which said high frequency components are removed, to obtain a frequency spectrum; and computing said leakage power to the adjacent channel from said frequency spectrum.

2. The measurement method according to claim 1, wherein said leakage power is computed after a noise floor of a measurement system is measured and a power value in the frequency spectrum is compensated based on said noise floor.

3. The measurement method according to claim 1, wherein a decimation processing is executed for said in-phase and quadrature components from which said high frequency component are removed, and the complex Fourier transformation is executed for said in-phase and quadrature components after having being subjected to the decimation processing.

4. The measurement method according to claim 1, wherein said predetermined intermediate frequency is lower than a frequency of said transmitting signal.

5. The measurement method according to claim 3, wherein said leakage power is computed after a noise floor of a measurement system is measured and a power value in the frequency spectrum is compensated based on said noise floor.

6. The measurement method according to claim 1, wherein an instantaneous value of a cosine function of a predetermined frequency and an instantaneous value of a sine function of said predetermined frequency are produced every sampling, and each of said instantaneous values is multiplied by said digital signal, thereby resolving said digital signal into said in-phase and quadrature components.

7. A measurement apparatus for a leakage power which measures the leakage power of a transmitting signal to a channel adjacent to a transmitting channel, said transmitting signal for said transmitting channel being produced from a tested objective, comprising:

a frequency conversion means for converting said transmitting signal into an intermediate frequency signal of a predetermined intermediate frequency;

an A/D conversion means for sampling said intermediate frequency signal with a predetermined sampling frequency to convert it into a digital signal;

a quadrature detection means for resolving said digital signal into an in-phase component and a quadrature component;

a Fourier transformation means for executing a complex Fourier transformation for said in-phase component and said quadrature component provided from said quadrature detection means to obtain a frequency spectrum; and a computing means for computing said leakage power from said frequency spectrum.

8. The measurement apparatus according to claim 7, wherein a low-pass filter means for removing a high frequency component from each of said in-phase and quadrature components is arranged between said quadrature detection means and said Fourier transformation means.

9. The measurement apparatus according to claim 8, wherein a decimation means for thinning out data of said in-phase and quadrature components at a predetermined rate is inserted between said low-pass filter means and said Fourier transformation means.

10. The measurement apparatus according to claim 7, wherein said quadrature detection means comprises a first signal generating means for generating an instantaneous value of a cosine function of a predetermined frequency every sampling; a first multiplication means for multiplying an output from said first signal generating means with said digital signal to output the multiplication result as a signal of the in-phase component; a second signal generating means for generating an instantaneous value of a sine function of said predetermined frequency every said sampling; and a second multiplication means for multiplying an output from said second signal generating means with said digital signal to output a multiplication result as a signal of the quadrature component signal.

11. The measurement apparatus according to claim 7, wherein said predetermined intermediate frequency is lower than a frequency of said transmitting signal.

* * * * *